(12) United States Patent
Thirumalai

(10) Patent No.: US 8,620,891 B1
(45) Date of Patent: Dec. 31, 2013

(54) RANKING ITEM ATTRIBUTE REFINEMENTS

(75) Inventor: Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 161 days.

(21) Appl. No.: 13/172,518

(22) Filed: Jun. 29, 2011

(51) Int. Cl.
*G06F 7/00* (2006.01)
*G06F 17/30* (2006.01)

(52) U.S. Cl.
USPC .......................................................... 707/705

(58) Field of Classification Search
USPC .......................................................... 707/722
See application file for complete search history.

(56) References Cited

U.S. PATENT DOCUMENTS

| | | | |
|---|---|---|---|
| 6,963,867 B2 * | 11/2005 | Ford et al. | 707/752 |
| 7,003,503 B2 * | 2/2006 | Crosby et al. | 706/48 |
| 7,185,012 B1 | 2/2007 | Koudas et al. | |
| 7,249,058 B2 | 7/2007 | Kim et al. | |
| 7,617,209 B2 * | 11/2009 | Whitman et al. | 1/1 |
| 7,698,261 B1 * | 4/2010 | Khoshnevisan | 707/999.003 |
| 7,890,528 B1 * | 2/2011 | Khoshnevisan | 707/769 |
| 2005/0080771 A1 * | 4/2005 | Fish | 707/3 |
| 2006/0026145 A1 * | 2/2006 | Beringer et al. | 707/3 |
| 2008/0134100 A1 * | 6/2008 | Ferrari et al. | 715/854 |

OTHER PUBLICATIONS

Kuo et al., Ranking and Selecting Terms for Text Categorization via SVM Discriminate Boundary, IEEE, 2005, pp. 496-501.
Moore et al., Statistical Threshold Design for the Two-State Signal-Dependent Rank Order Mean Filter, IEEE, 2000, pp. 904-907.
Mukopadhya et al., An Algorithm for Automatic Web-Page Clustering using Link Structures, IEEE, 2004, pp. 472-477.

* cited by examiner

*Primary Examiner* — Robert W. Beausoliel, Jr.
*Assistant Examiner* — Michael Pham
(74) *Attorney, Agent, or Firm* — Novak Druce Connolly Bove + Quigg LLP

(57) ABSTRACT

Systems and methods for enabling refinement of information sets utilize recorded instances of user behavior in connection with information units of the information sets. Information units are each associated with one or more attributes and provided to users in ranked information sets. Instances of user selection of information units are used to determine how refining search result sets according to attributes would have improved the positions of the selected information units. Information is accumulated accordingly to determine how to present representations of attributes to users to enable the users to refine information sets.

25 Claims, 9 Drawing Sheets

RANKING ITEM ATTRIBUTE REFINEMENTS

BACKGROUND

Information sets may be provided to users in a variety of circumstances. For example, a list of search results, where each search result corresponds to one or more items, may be provided to a user in response to a search query submitted by the user. As another example, a user may browse an electronic catalog of items and, at various times during the user's navigation, information sets corresponding to items presented by the catalog may be presented to the user. Information sets may be provided in various forms, such as lists, arrays, and, generally, other forms.

Providing information sets to users often includes various attempts to select and provide information sets that are relevant to the user, desired by the user, or otherwise useful. However, effectively providing information sets can be challenging. For example, search results for a search query submitted by a user may include more information than the user sought. A search query for the word "ducks," for instance, may result in search results corresponding to a wide variety of items, including sports memorabilia, shoes, toys, and others. Similarly, a section of a catalog that a user is browsing may include information corresponding to numerous items, many of which may not be of interest to the user. While various techniques have been employed to effectively present information sets to users, due to the complexity of information retrieval in general, the employed techniques are of varied success.

DETAILED DESCRIPTION

Figure 1:
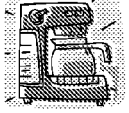
FIG. 1 shows an illustrative example of an information set presentation in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for enabling refinement of information sets. The information sets, in some embodiments, are search result sets that have been provided responsive to search queries. The information sets may be provided in other ways, such as in response to navigational acts by users. An information set may, for example, be provided to a user in response to the user having navigated to a particular location in an electronic marketplace. In an embodiment, information units in an information set correspond to items. The items may be items that are offered for consumption in an electronic marketplace and may include consumer goods, electronic items, services, access rights, and other consumable items. The information units of an information set may be, for example, search results that correspond to items offered for consumption in the electronic marketplace, where the search results may have been provided responsive to a user-submitted search query or another navigational act.

In an embodiment, information units of an information set are provided to a user with interface elements that enable the user to refine the information set (refinement elements). The interface elements may be, for example, selectable elements of a graphical user interface that, when selected, cause a corresponding refinement of the information set to occur. The selectable elements may correspond to attributes that are associated with the information units and the interface elements may graphically indicate the attributes to which they correspond. For example, the attributes may be features of items that correspond to search results. Selecting an interface element corresponding to a feature may cause modification (such as refinement) of the search results to exclude items that do not have the feature (or at least cause items not having the feature to be provided less prominently).

In an embodiment, user behavior in connection with information units is used to determine how refinement elements are provided in connection with information sets. Actions taken by users in connection with information units in information sets may be recorded and used to score attributes associated with the information units to enable ranking of the refinement elements. The actions may be user selections of the information units and/or other actions that indicate user interest in the information units. For example, instances of user selection of search results or other information units of ranked information sets may be used to rank attributes of items corresponding to the search results or other information sets.

The user behavior may be used in various ways. For example, in an embodiment, user selection of an information unit in an information set allows for a determination of how various refinements to the information set would have improved the placement of the selected information unit within the information set when modified according to the refinements. For instance, each information unit may be associated with one or more attributes and some information units may be associated with attributes with which other information units are not. Accordingly, in an embodiment, user selection of an information unit in an information set allows for measurements regarding how various refinements would have changed the rank of the information unit in the information set. Each member of a set of attributes associated with the selected information unit may be scored according to how modifying (such as refining) the information set based at least in part on the attribute would have moved the selected information unit within the information set. For example, if the selected information unit is associated with an attribute and other information units in the set are not associated with the attribute, modifying the information set according to the attribute would have caused the selected information unit to achieve a better ranking in the modified information set. The amount by which the selected information unit would have moved may be used to score the attribute.

Data regarding user behavior in connection with information units may be accumulated over time so that attributes associated with information units are scored according to multiple instances of user actions over a time period. Accordingly, an attribute may be scored based at least in part on user behavior in connection with items associated with the attribute that were presented to users, such as in response to search queries submitted by the users or in connection with user navigation. Scores for the attributes may be used to rank attributes so that corresponding refinement elements may be presented according to the ranking. For example, a set of refinement elements may be presented in connection with an information set such that the refinement elements appear in an order that corresponds to the ranking of the corresponding attributes.

FIG. 1 shows an illustrative example of an information set presentation 100, in accordance with an embodiment. In this particular example, the information set presentation 100 is a web page displayed on a web browser interface 102. The web page illustrated in FIG. 1 includes a result pane 104 on the right-hand side of the web page and a refinement pane 106 on the right-hand side of the web page. In this example, the result pane 104 includes an ordered set of search results, where a search result may be a representation of an item. The item may be any item offered for consumption, including consumer goods, electronic items, access rights, services, and, generally, any item that is consumable by a consumer. The search results illustrated in FIG. 1 may have been identified as responsive to a search query submitted by a user. For instance, in this example, the web page includes a search box 108 that illustrates a search query that the user has submitted. In this example, as illustrated, the user has submitted a search query for "coffee machine." Accordingly, FIG. 1 illustrates the search results in the result pane 104 as corresponding to various coffee machines. The user may have submitted the search query because he or she was interested in purchasing a coffee machine in an electronic marketplace that includes the web page. The user may have submitted the search query for other reasons. The user may, for example, be conducting research on coffee machines, perhaps for a potential purchase of one.

While, for the purpose of illustration, a set of search results that have been provided responsive to a user-submitted search query are presented in FIG. 1, embodiments of the present disclosure are applicable in other contexts as well. For example, in one example, search results may not be provided responsive to a user-submitted search query, but in response to another action. The search results shown in FIG. 1, for instance, may have been provided subsequent to user selection of a hyperlink. The user may have selected the hyperlink to navigate to a coffee machine department of an electronic marketplace. Selection of the hyperlink may have resulted in a search being performed (such as a search for "coffee machines," in this example) without the user actually having input the terms "coffee machine." Similarly, the search results may have been predetermined to correspond to the hyperlink. The search results may, for example, be encoded in a static hypertext markup language (HTML) document that is provided to the user upon selection of a hyperlink and the document may not be determined dynamically, such as, in response to a submitted query.

As noted, as illustrated, the web page includes a refinement pane 106. The refinement pane 106, in this example, includes various interface elements that enable a user to refine the set of search results in the result pane 104. As an example, the refinement pane 106 includes a department refinement set 110 that includes selectable descriptions that allow a user to refine the search results to those associated with a particular department and/or sub-department. In this example, a "Kitchen & Dining" department has been selected, as indicated by "Kitchen & Dining" being in boldface. A user, in this example, may select an element in the department refinement set 110 to affect results in the results pane accordingly. For example, if the user selects "Drip Coffee Machines," results in the result pane 104 may be refined to only include results associated with Drip Coffee Machines. For example, results corresponding to coffee machines such as French press coffee machines and espresso machines may be excluded from the search results in the result pane 104. Refinement of the results in the search result pane 104 may be performed in various manners. In one embodiment, for example, a user device sends a message over a communications network to a system that operates in connection with the electronic marketplace that includes the web page. The system of the electronic marketplace may refine the results and send the refined results to the user device which may then display the refined results in the result pane 104. The system may refine the results by refining a search result set already obtained, submitting a new search according to the refinement to a search engine and obtaining a new set of search results, or otherwise. Asynchronous JavaScript and XML (AJAX) or other techniques may be utilized to enable refinement in such a manner. In addition, various other methods of refining search results are considered as being within the scope of the present disclosure. For example, a search result set may be initially provided to the user device with programming logic that enables the user device to refine the search results itself. When search results are refined, new results may appear in place of search results that were removed due to the refinement.

As another example of elements in the refinement pane 106, the refinement pane 106 in this example includes a brand refinement set 112 which includes a plurality of checkboxes that allow a user to select one or more brands of interest. For instance, if a user was interested in only Acme brand and Ace brand coffee machines, he or she could select corresponding checkboxes and, as a result, results in the result pane 104 may be refined to include only results associated with the Acme and Ace brands. However, as with all refinements, results that would violate a refinement condition (such as results not associated with Acme and/or Ace brands) may appear in the result pane after a refinement is made. There may be various reasons for this, such as inclusion of other results as a promotional or marketing strategy, experiments with user behavior, and the like.

Also shown in the result pane 106 is a feature refinement set 114 which includes a plurality of checkboxes that allow a user to select one or more features he or she is interested in. As with the brand refinement set 112, selection of one or more checkboxes of the feature refinement set 114 may result in results in the result pane to be refined to only include results that are identified as having a particular feature. As an example, selecting the "automatic" from the feature refinement set 114 may result in only search results corresponding to automatic coffee makers being displayed in the result pane 104. As above, additional checkboxes may be selected to further refine the search results in the result pane 104. For example, selection of the checkbox next to "Glass" may cause results in the result pane 104 to display only results corresponding to items identified as including glass carafes.

The features in the feature refinement set 114, as with any attributes that may be used to refine search results, may be identified for inclusion in a refinement pane (or other portion of an interface) in various ways. For example, in an embodiment, an electronic marketplace includes a data store of information relating to items offered for consumption. Automated and/or semi-automated processes may be used to identify from the stored information various features of the items. Features may also be identified in other ways. For example, various users (such as employees of an electronic marketplace, employees of manufacturers of the items, members of the general public, etc.) may manually input features of items offered for consumption. Items may be categorized and items in a particular category may be identified as having various features associated with the category. For example, in a "Drip coffee machine" category, various drip coffee machines may be associated in a data store with features that each drip coffee machine has. Data may be recorded, for example, that indicates that a particular drip coffee machine is automatic, has a glass carafe, has a digital readout, and the like.

A category of items may, therefore, be associated with a plurality of features (or, generally, attributes) of that category. When search results include items of the category, features from the category may be included in a refinement pane or other part of an interface. The user may, for example, have navigated to a portion of an electronic catalog corresponding to the category, may have refined search results to a particular category, and/or may have submitted a search query for which a relatively large portion of the results were from a particular category. As illustrated in FIG. 1, the number of features or attributes that apply in any given circumstance may be more than is practical to display. For instance, the features refinement set 114 includes a "more features" element that, when selected, causes more features to appear to allow the user to select from a larger set of features. Selecting "more features" may, for instance, cause features such as "thermal carafe," "pump," "grinder," and other features commonly associated with coffee machines to appear. Similarly, the brand refinement set 112 includes a "more brands" element that may cause more brands to appear to allow selection by the user.

As illustrated in FIG. 1, other types of refinements may also be included. For instance, a color refinement set 116 allows a user to select elements corresponding to colors in which the user may be interested. Selection of "SS," for example, may cause results in the result pane 104 to be refined to results that are identified as having a stainless steel exterior. As another example, a price refinement set 118 allows a user to select from a variety of price ranges to refine the set of results in the result pane 104 accordingly. Selection of "$25-$50" may, for example, cause results in the result pane 104 to be limited to results corresponding to coffee machines that cost between twenty five and fifty dollars.

As can be seen from FIG. 1, various ways of refining the results may be provided to the user. Some refinement sets, such as the price refinement set 118, may allow for only one selection while others, such as the feature refinement set 114, may allow for selection of multiple refinements. Further, interface elements may be provided in various ways. For instance, the color refinement set, as illustrated, includes a plurality of interface buttons that are colored with corresponding colors while other interface elements appear as checkboxes and/or selectable text. Interface elements other than those illustrated may also be provided and, generally, the selection of interface elements in FIG. 1 (and other figures) were selected for the purpose of illustration.

Figure 2:
FIG. 2 shows an illustrative example of an information set presentation after a user has selected a feature presented in the information set presentation of FIG. 1 in accordance with at least one embodiment.

As discussed, selection of various refinement elements in the refinement pane 106 may cause the set of search results in the result pane 104 to change. FIG. 2 shows an illustrative example of how search results in the result pane 104 pursuant to user selection of a refinement in the refinement pane 106. In particular, FIG. 2 shows an illustrative example of an information set presentation 200, in accordance with an embodiment. In this particular example, the information set presentation 200 is a web page displayed on a web browser interface 202, but could take other forms. As with the presentation 100 in FIG. 1, the web page includes a result pane 204 and a refinement pane 206 which are configured similarly to their counterparts of FIG. 1.

The result pane 204 of FIG. 2, for example, includes an ordered set of search results where each search result corresponds to an item offered for consumption in an electronic marketplace. The refinement pane 206 includes various options that a user may select to refine the search results shown in the result pane 204. For instance, as with the refinement pane 106 of FIG. 1, the refinement pane 206 of FIG. 2, in this example, includes a department refinement set 210, a brand refinement set 212, a feature refinement set 214, a color refinement set 216, and a price refinement set 218, each configured similar to their similarly named counterparts of FIG. 1.

However, as illustrated in FIG. 2, a user has selected a refinement in the feature refinement set 214, namely, the "glass" feature, which, in this example, corresponds to items identified as including a glass carafe. As a result, the search results illustrated in the result pane 204 of FIG. 2 are different from the search results shown in the result pane 104 of FIG. 1. In this instance, only search results corresponding to items identified as including a glass carafe are included in the result pane 204 of FIG. 2. For example, the fourth and fifth search results of FIG. 1 (as numbered in the figure) are missing from the search result in the result pane 204 of FIG. 2. As noted in a short description of the fourth search result of FIG. 1, for example, the item includes not a glass carafe, but a thermal carafe. Similarly, the fifth search result of FIG. 1 is pictured as a stovetop espresso maker and, therefore, would not typically include a glass carafe.

Because of the removal of the fourth and fifth search results from the search result set, the sixth search result of FIG. 1 becomes the fourth search result of FIG. 2. Similarly the seventh search result of FIG. 1 becomes the fifth search result of FIG. 2. The sixth and seventh search results of FIG. 1, in this example, are pictured with glass carafes and, therefore were not removed from the search result list upon user selection of the "glass" refinement.

Figure 3:
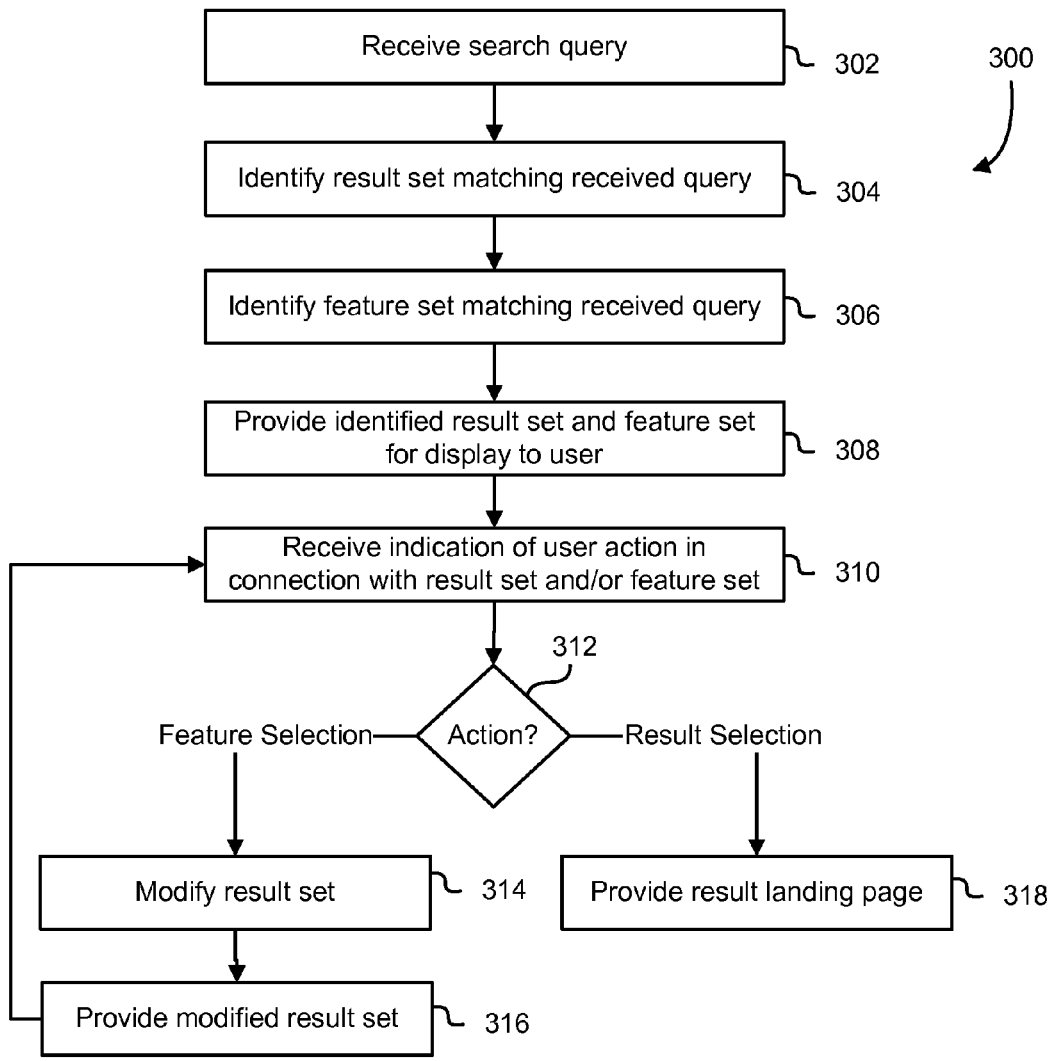
FIG. 3 shows an illustrative example of a process that may be used to enable user navigation in connection with an information set in accordance with at least one embodiment.

FIG. 3 shows an illustrative example of a process 300 which may be performed in connection with providing an information set, such as search results. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, a search query is received 302. The search query may be, for example, a search query submitted by a user that inputted the search query or performed some action, such as selection of an interface element, that caused the search query to be submitted. A result set matching the received search query may then be identified 304. A search engine, for example, may be utilized to retrieve a set of results that are responsive to the search query. In addition, a feature set matching the received search query is identified 306. Identifying the feature set may be performed in any suitable manner, including in a manner described below. For example, some search queries may be associated with feature sets in a data store. If the received search query matches a query stored in the data store, the associated feature set may be retrieved from the data store. If the received query was not in the data store—for example, because the query had not been received before, or had not been received enough times—then another query that is in the data store (such as a query that is semantically or otherwise similar to the received search query) may be identified and an associated feature set may be obtained. Feature sets may also be determined dynamically. For instance, items may be identified as having certain features. Accordingly, items corresponding to search results matching the search query may be used to identify a set of features. Generally, any suitable manner of identifying a feature set based at least in part on the search query may be used. In addition, identifying a feature set may include other actions, such as identifying an initial feature set and selecting a subset of the initial feature set. Selecting the subset may include ranking the features in the initial feature set and/or selecting a set of features from the initial feature set ranked the highest.

In an embodiment, once identified, the feature set and result set are provided for display to the user. Providing the feature set and result set may be performed in any suitable manner and the manner in which the feature set and result set are provided may depend on context, such as an application and/or device being to view the feature set and result set. For example, as illustrated in FIGS. 1 and 2, search results and features sets may be provided as part of a web page provided to the user, although other manners of providing the information to the user are considered as being within the scope of the present disclosure.

As discussed, when provided search results and a feature set, the user may take various actions. For example, the user may select a search result or refine the search result set by selecting a feature of the feature set. The user may take other actions, such as navigating away from the search result set, although those actions are not discussed in connection with FIG. 3. As shown in FIG. 3, when the user takes some sort of action, an indication of the user action may be received 310. The indication may indicate whether the user selected a feature from the feature set, selected a search result, or took some other action. In an embodiment, when an indication of the user action is received, a determination is made 312 regarding the type of action taken by the user. For example, as illustrated in FIG. 3, if the received indication indicates that the user selected a feature from the feature set, the result set may be modified 314 according to the feature (or features and/or other refinements) selected by the user. Modifying the result set may be performed in various ways. For example, in one embodiment, some or all results from the result set that lack the selected feature(s) may be excluded from the result set. As another example, the result set may be re-ranked such that some or all results from the result set that lack the selected feature(s) have a worse ranking. For instance, the results lacking the selected feature(s) may be placed at the end of a ranked list of results, thereby causing the ranking of results having the selected feature(s) to improve. The modified set may be then provided 316 to the user. For example, the modified result set may be provided to a device of the user over a communications network. As illustrated, the user may select additional features, which may be used to further refine the search results. If, however, the user selected one of the results that were provided, a landing page corresponding to the selected search result may be provided to the user. The landing page may be, as one example, a web page that provides information about an item corresponding to the search result.

As with any process described herein, variations of the process 300 are considered as being within the scope of the present disclosure. For example, while features are described above (and elsewhere herein) for the purpose of illustration, embodiments of the present disclosure apply to or may be adapted to apply to attributes in general. In formation, while processing and refining search queries is described for the purpose of illustration, techniques described and suggested herein also apply to more general information retrieval processes. In addition, as discussed, portions of the process 300 (or other processes) may be performed by a user device while other portions may be performed by other devices, such as a system of an electronic marketplace. Other variations, including others described herein, are also considered as being within the scope of the present disclosure.

Figure 4:
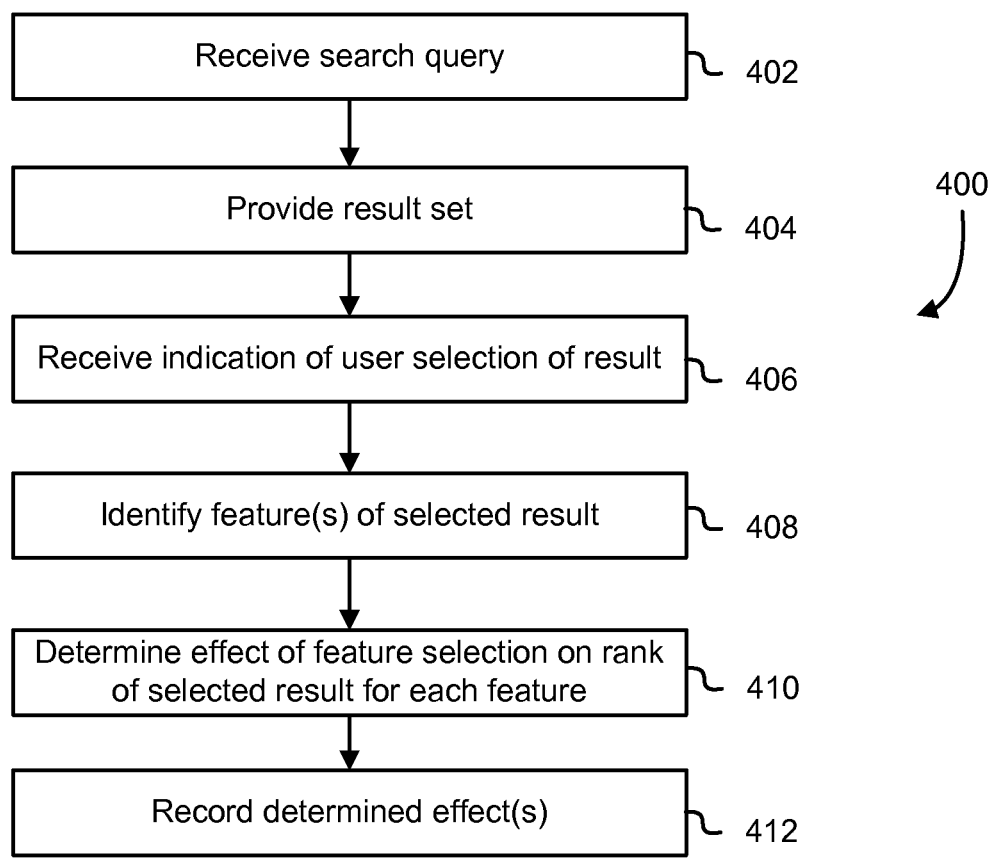
FIG. 4 shows an illustrative example of a process that may be used to record information regarding attributes of items in accordance with at least one embodiment.

As discussed, embodiments of the present disclosure are directed to providing users options for refining searches based at least in part on past user behavior. FIG. 4 shows an illustrative example of a process 400 that may be used to record past user behavior. In particular, FIG. 4 illustrates a process 400 that allows for the recording of behavior based at least in part on how certain ways of refining search results would have improved the search results. In an embodiment, the process 400 includes receiving a search query, such as in a manner described above. Further, in an embodiment, the process 400 includes providing a result set and receiving an indication of a result selected by the user. A feature set may also be provided, although not necessarily.

In an embodiment, one or more features of the selected result are identified 408. Identification of the one or more features may be performed in any suitable manner. For example, as noted above, a data store may associate items corresponding to the search results with features of that item. In such instances, features may be identified by retrieving appropriate information from the data store. Features may be identified in other ways. For instance, information about the item may be analyzed to extract features about the item. Generally, features may be identified in any suitable manner.

In an embodiment, for each identified feature, an effect of selecting the feature on the rank (change in position among the search results) of the selected search result is determined 410. In other words, for each feature, a determination is made how the position of the search result would have changed had the user selected the feature. As an example, if the search result was the fourth search result in a list of search results and selecting a particular feature would have caused the search result to be the first search result, a determination may be made that indicates that selecting the particular feature would have decreased the rank of the search result by three (moved the search result three places toward the top of the list). Determining the effect of a feature may include calculating a measure on the effect. As noted, the measure may be a number of places the search result would have moved in a search result list. Other measures may also be used in addition or as an alternative. For example, a reciprocal rank reduction score may be calculated for the feature. The reciprocal rank reduction score may be calculated as (or at least based at least in part on):

$$\frac{1}{s} - \frac{1}{r}$$

where selection of the feature would have moved the search result from position r to position s. As an illustrative example, if selection of the feature would have moved the search result from the fourth position (r=4) to the first position (r=1), the reciprocal rank reduction score may be:

$$\frac{1}{1} - \frac{1}{4} = 0.75.$$

Thus, in this example, the reciprocal rank reduction score represents both how close selection of the feature would have moved the search result toward the top of the search result list as well as how far the search result would have moved within the list. It should be noted that the above is just one example of how an effect of selecting a feature may be calculated. Other calculations are considered as being within the scope of the present disclosure. In an embodiment, once the effect of selection of a feature is determined 410, the determined effect is recorded 412 for each feature. Recording the determined effect(s) may include storing calculations in a data store, updating cumulative calculations in a data store, and, generally recording information that represents the determined effect(s).

Figure 5:
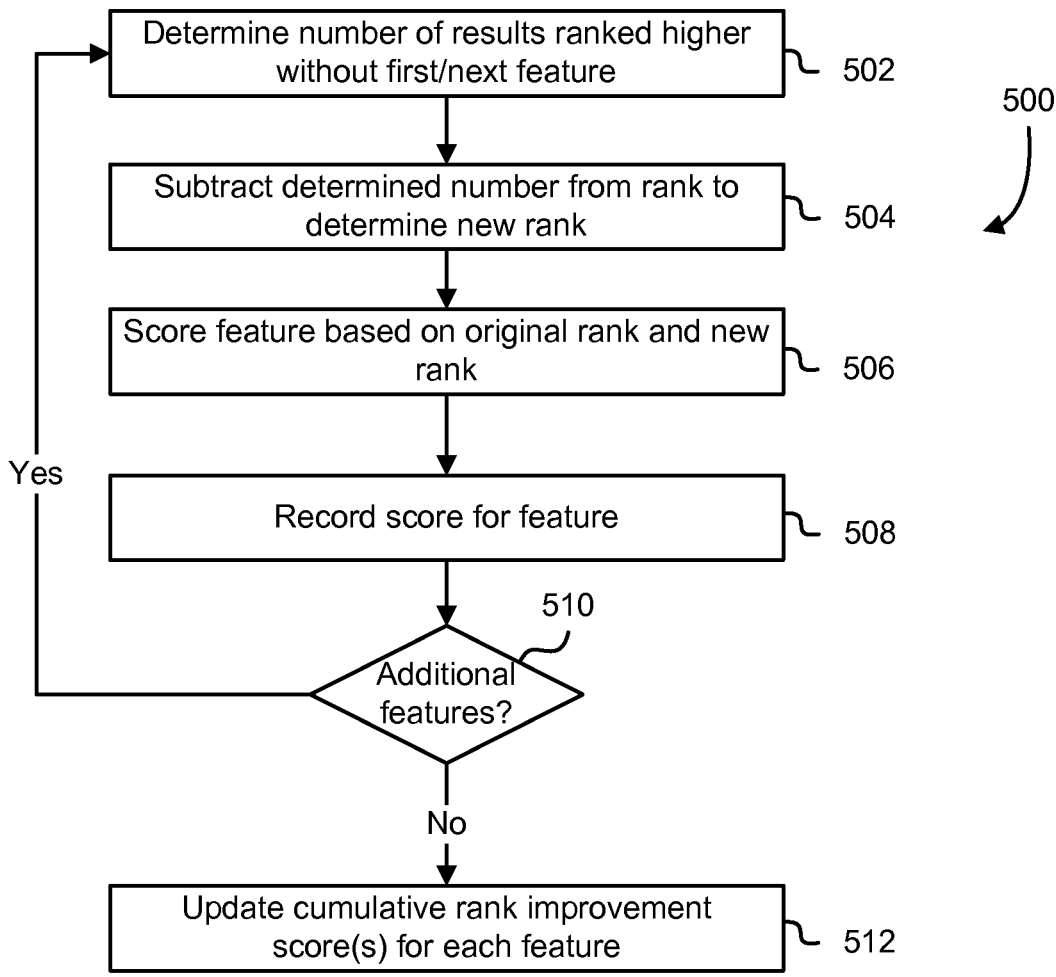
FIG. 5 shows an illustrative example of a process that may be used to update scores for attributes of items in accordance with at least one embodiment.

As discussed, one way of determining the effect of selection of a feature on a search result in a search result list includes calculating a measurement that is based at least in part on movement of the search result in a list of search results that would have occurred had the feature been selected. Accordingly, FIG. 5 shows an illustrative example of a process 500 for determining such an effect for features of an item corresponding to a search result and recording the determined effect(s). The process 500 may be used, for instance, in connection with the process 400 described above in connection with FIG. 4. The process 500 may be used for determining the effect.

In an embodiment, the process 500 of FIG. 5 includes determining 502 a number of results ranked higher without a first feature of an item corresponding to a search result, such as a search result selected by a user. Using the example of FIG. 1, if the first feature corresponds to having a glass carafe, and if the search result is the sixth search result, it may be determined that, among the search results ranked one through five, two of the search results are not identified as corresponding to items having a glass carafe. The determined number of search results ranked may be subtracted 504 from the rank to determine a new rank. Continuing the example of this paragraph, the new rank of the sixth search result would be four (six minus two). In other words, had a glass carafe feature been selected, the sixth search result would have become the fourth search result.

Once the new rank is determined, the feature may be scored 506 based at least in part on the determined new rank. A reciprocal rank reduction score, for example, may be calculated, although other scores may be used. When the feature has been scored, a score for the feature may be recorded 510, such as by storing in volatile or non-volatile memory. A determination may be made 510 whether there are additional features to score and, if there are additional features, the above portion of the process 500 may be performed for a next feature, as illustrated in FIG. 5. This may repeat until a determination is made that there are no additional features to score. When scores for the features have been calculated, the scores may be used to update 512 cumulative rank improvement scores for each of the features.

A cumulative rank reduction score for a feature may be a score that is based at least in part on past scores calculated for the feature. In an embodiment, the cumulative rank reduction score is a cumulative reciprocal rank reduction score which may be calculated as follows:

$$\frac{1}{N}\sum_{i=1}^{N} f(r_i, s_i)$$

where N represents the number of times a search result corresponding to an item having the feature has been selected and $r_i$ and $s_i$ respectively represent the final rank and initial rank of the ith search result selected by a user where the search result corresponds to an item having the feature. The function $f(r_i, s_i)$ may be any function that takes $r_i$ and $s_i$ as inputs. An example of such a function is:

$$f(r_i, s_i) = \frac{1}{r_i} - \frac{1}{s_i}$$

However, $f(r_i, s_i)$ may be any suitable function. The ordering of the search results corresponding to items having the feature that were selected may be in any order, such as temporal, or another order. In this manner, the cumulative reciprocal rank reduction score may represent an average reciprocal rank reduction over search results that correspond to items having the feature and that were selected.

It should be noted that the above cumulative reciprocal rank reduction is provided for the purpose of illustration and that other ways of calculating a cumulative reciprocal rank reduction may be used. For example, a cumulative rank reduction may be calculated iteratively, such as every time a search result corresponding to an item having the feature is selected by a user. An equation for updating a cumulative rank reduction may then be:

$$cr3_k = \frac{1}{k}\left(\frac{1}{r_k} - \frac{1}{s_k} + (k-1)cr3_{k-1}\right)$$

where $cr3_k$ represents the cumulative rank reduction score at the kth update and the right-hand side of the question is essentially the preceding formula for the cumulative reciprocal rank reduction written so as to compute $cr3_k$ iteratively.

Other cumulative rank reductions may also be used. For instance, the cumulative rank reduction for a feature may be calculated as follows:

$$\frac{g(N)}{N}\sum_{i=1}^{N} f(r_i, s_i)$$

where g(N) is a function of N and $f(r_i, s_i)$ may be any suitable function, such as described above. The function g(N) may be, for example, an increasing function such as log(N). By including g(N) as an increasing function in the calculation of scores, features of items that correspond to search results that are selected more often are given higher scores. In this manner, features that are common among items may have higher cumulative rank reduction scores, depending on how the selection of the features would generally improve search results. Similarly, using a decreasing function g(N) (such as the reciprocal of N) would have the opposite effect, if such is desired. In addition, g(N) may be constructed piecewise. For example, g(N) may be equal to zero until N is greater than some threshold and some other function (such as a constant function) for values of N greater than the threshold. In this manner, the cumulative rank reduction for a feature may be zero until enough data is accumulated for the feature, thereby avoiding high cumulative rank reduction scores for features that, while having a large effect on search result rankings when selected, are not commonly selected. A similar effect may be achieved by selecting g(N) such that the function slowly increases from zero.

In the above examples, and in other calculations, the cumulative rank reduction may be calculated for data over a period of time. In the above examples, for instance, N may represent the number of times a search result corresponding to an item having a particular feature has been selected over a time period, such as a month, a quarter, or another time period. Data may also be decayed over time so that, generally, older data has less of an effect on calculations than newer data. Other variations are also considered as being within the scope of the present disclosure. For example, data may be recorded differently. As one example, rank reduction scores may only be considered in certain instances. In an embodiment, for instance, $r_i$ and $s_i$ may respectively represent the final rank and initial rank of the ith search result selected by a user where the search result corresponds to an item having the feature and where selection of the feature would have decreased the rank of the search result (caused the search result to appear higher in the list). In this manner, the cumulative rank reduction score for a feature is not affected by instances when a search result corresponding to an item appears as the first search result and is selected.

Figure 6:
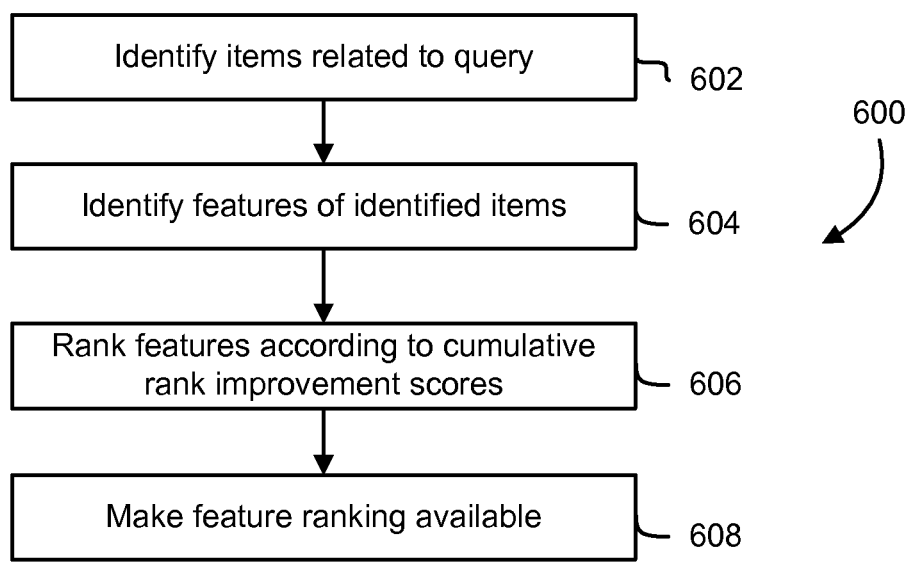
FIG. 6 shows an illustrative example of a process that may be used to rank attributes in connection with queries in accordance with at least one embodiment.

As discussed, queries may be associated by a data store with features. FIG. 6 shows an illustrative example of a process 600 that may be used to associate features with queries. In an embodiment, items related to a query are identified 602. The items may be identified by, for instance, submitting the query to a search engine that, in response, provides search results that each correspond to one or more items, although other methods of determining which items are related to a query may be used. Once the items have been identified, features of the identified items may be identified 604. In an embodiment, features related to items are predetermined (such as by automated, semi-automated, manual, and/or other means) and associated with the items in a data store. Accordingly, identifying the features of the identified items may be performed by obtaining the features from such a data store. The features may also be identified in other ways, such as by dynamically analyzing information related to the items at the time the process 600 is being performed.

In an embodiment, features are stored in a manner that associates the features with corresponding cumulative rank improvement scores. Accordingly, in an embodiment, the identified features are ranked 606 according to their cumulative rank improvement or other scores. The ranking of the features may then be made 608 available. If the process 600 is being performed at the time the search query is being processed and results are provided to the user, the ranking may be used to rank features to allow a user to select the features to refine the search results. If the process 600 is being performed in advance of processing search queries, the ranking may be made available for use in connection with future queries. For example, the ranking may be associated with the query in a data store. When the query (or another query related to the query) is received at a future time, the ranking may be used to provide features to allow a user to refine the search results, such as in a manner described above.

As with other processes described herein, variations of the process 600 described above are considered as being within the scope of the present disclosure. For example, FIG. 6 illustrates a process wherein a feature ranking is associated with a search query. Variations of the process 600 may be used to make feature rankings available in other ways. For example, as noted, information sets may be provided in ways other than in response to search results. A user may, for example, be presented information sets upon navigating to various categories of items. User behavior selecting information units within a category may be used to aggregate information over a time period to associate a feature ranking with the category. In one embodiment, for example, a feature ranking may be determined for a category by identifying search queries that have resulted in user selection of items within the category. Information used to determine feature rankings associated with the identified search queries (and/or the feature rankings themselves) may be aggregated to determine a feature ranking for the category. As another example, generally, features of items selected by users within ranked information sets (which do not necessarily need to have been provided in response to search query submissions) may be used to determine a feature ranking for a category in a manner similar to that described in connection with FIG. 6. Other variations, including combinations of the above-described techniques may be used to determine feature rankings and associate the feature rankings with ranked information sets.

Figure 7:
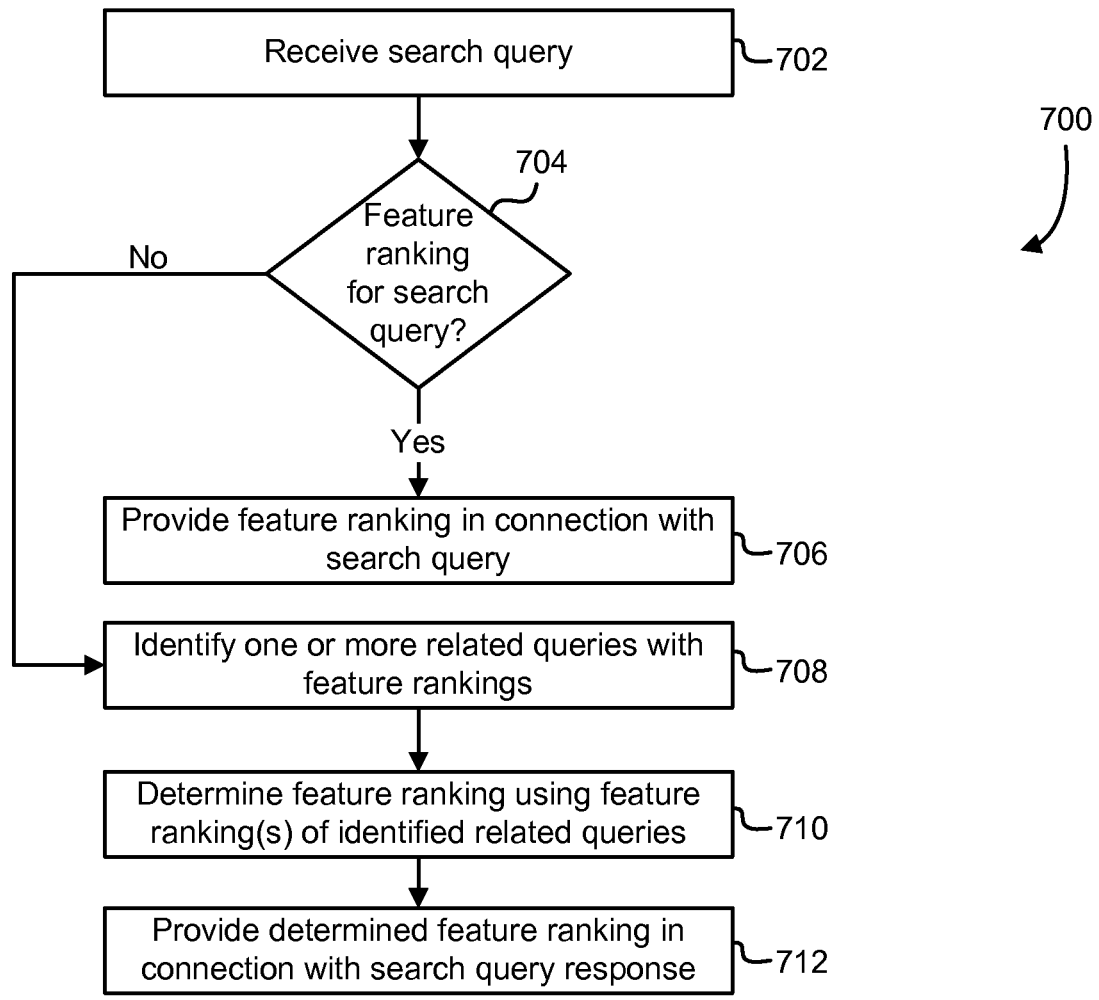
FIG. 7 shows an illustrative example of a process that may be used to provide a ranked set of attributes to enable information set refinement in accordance with at least one embodiment.

As discussed, embodiments of the present disclosure enable the presentation of features and other attributes in a manner that allows users to effectively refine information sets. FIG. 7, accordingly, provides an illustrative example of a process 700 that may be used to provide features to enable a user to refine a set of search results. In an embodiment, a search query is received 702, such as in a manner received above. In addition to other actions that may be taken in connection with processing the search query, a determination may be made 704 whether there is a feature ranking for the search query. For instance, if search queries are associated with feature rankings in a data store, the data store may be accessed to determine whether the particular query received is associated with a feature ranking in the data store. If it is determined that there is a feature ranking for the query, in an embodiment, the feature ranking is provided 706 in connection with a response to the search query. Providing the feature ranking may include, for example, providing the features according to the ranking with search results. The feature ranking may be, for example, the features electronically organized to the ranking Alternatively, the ranking may be provided to enable another system, such as a user device, to organize features according to the ranking. It should also be noted that providing the feature ranking may also include other actions, such as selecting a subset of features from a set of potentially applicable features.

If a determination is made 704 that there is not a feature ranking for the search query, one or more related queries having corresponding feature rankings may be identified 708. A search query that is semantically similar to the received search query and that is associated with a feature ranking, for example, may be identified. In an embodiment, when the one or more related queries are identified 708, feature ranking(s) of the one or more related queries may be used to determine 710 a feature ranking for the received query. The determined feature ranking for the received query may be, for example, the feature ranking of another related query. If several related queries are identified, features may be ranked using information from multiple feature rankings A feature ranking for the received search query may, for example, be based at least in part on an average ranking for each of a plurality of features. In an embodiment, once the feature ranking is determined 710, the determined feature ranking 712 may be provided 712 in connection with a response to the received search query, such as in a manner described above.

Figure 8:
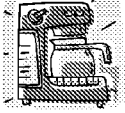
FIG. 8 shows an illustrative example of an information set presentation that has a set of attributes provided in accordance with at least one embodiment.

FIG. 8 shows an illustrative example of an information set presentation 800, in accordance with an embodiment. In this particular example, the information set presentation 800 is a web page displayed on a web browser interface 802, but, as described above, could take other forms. As with the presentation 100 in FIG. 1, the web page of FIG. 8 includes a result pane 804 and a refinement pane 806 which are configured similarly to their counterparts of FIG. 1. The result pane 804 of FIG. 8, for example, includes an ordered set of search results where each search result corresponds to an item offered for consumption in an electronic marketplace. The refinement pane 806 includes various options that a user may select to refine the search results shown in the result pane 804. For instance, as with the refinement pane 106 of FIG. 1, the refinement pane 806 of FIG. 8, in this example, includes a department refinement set 810, a brand refinement set 812, a feature refinement set 814, a color refinement set 816, and a price refinement set 818, each configured similar to their similarly-named counterparts of FIG. 1.

In FIG. 8, however, the feature refinement set 814 is configured differently than the feature refinement set 114 illustrated in FIG. 1. As illustrated, the feature refinement set 814 is organized according to a ranking that may have been determined using the above techniques. For instance, as illustrated in FIG. 1, the feature refinement set 114 is ranked according to the number of results corresponding to items having the feature, as indicated in parentheses next to each feature. In FIG. 8, however, the features of the feature refinement set 814 are ranked according to how, cumulatively over time, effective the features would have been in refining search results. For example, a "single serving" feature is ranked first in FIG. 8 while ranked fifth in FIG. 1. Other features are organized differently than in FIG. 8 and, in addition, a "thermal carafe" feature in Figure has replaced the "glass" feature of FIG. 1 due to the feature, over time, being measured to be more useful for refining search results according to the above description.

As noted, variations of the present disclosure are considered as being within its scope. For example, the above description relates to various processes. Variations of these processes are considered as being within the scope of the present disclosure, as are combinations of the above processes and their variations. In addition, the above description uses features of items for the purpose of illustration. However, the above techniques may be adapted for use in other ways. The above techniques, for example, may be adapted to provide ranked attributes that may be used to refine information sets, where information sets are not limited to search results. Further, while web pages are used to illustrate various concepts, techniques of the present disclosure may be adapted for use in any context where information sets are provided to users. Generally, the above techniques are generally adaptable for providing users ways of refining information sets and ranking those ways.

Figure 9:
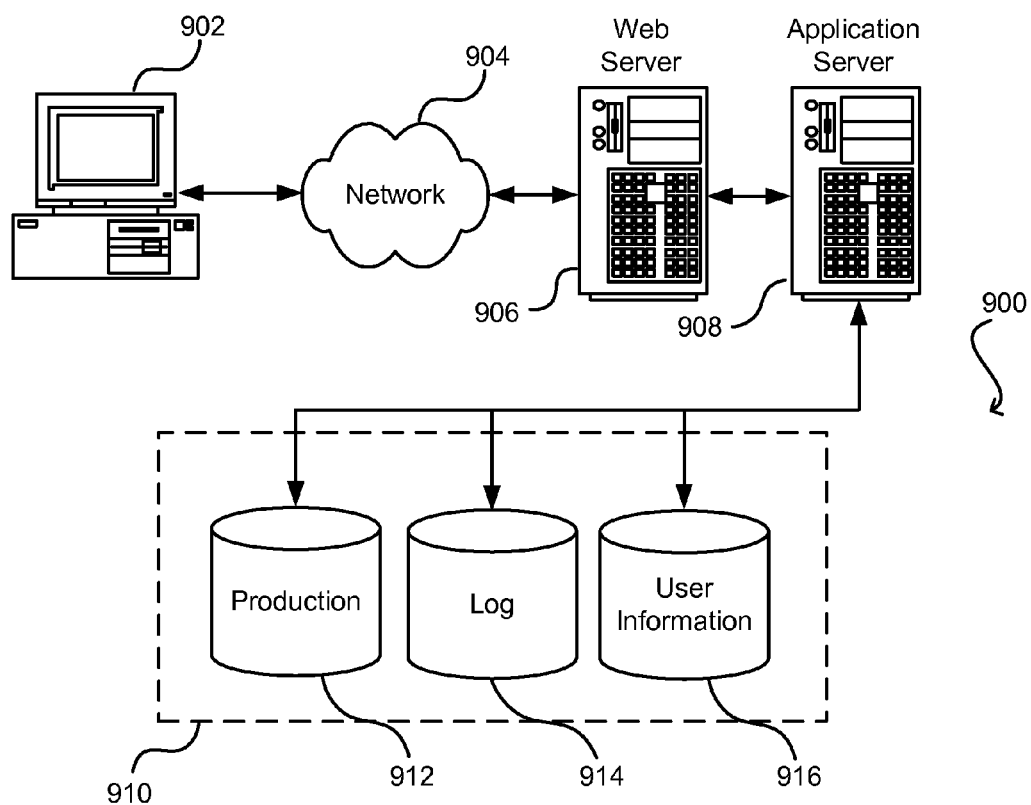
FIG. 9 illustrates an environment in which various embodiments can be implemented.

FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/ or video to be transferred to the user, which may be served to the user by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for presenting search results, comprising:
    under the control of one or more computer systems configured with executable instructions,
        for each search result of a plurality of search results that have been selected by users from corresponding search result sets, identifying one or more features associated with the search result;
        for each identified feature of the one or more features, determining a potential improvement in position for at least one selected search result within a corresponding search result set, the potential improvement including a number of places that the at least one selected search result would have moved within the corresponding search result set had an identified feature of the one or more features been selected and achievable by refining the corresponding search result set according to the identified feature of the one or more features;
        using the determined potential improvement to calculate a feature score for the identified feature of the one or more features;
        for each of a plurality of search queries, ranking a set of features based at least in part on corresponding calculated feature scores for the identified features of the one or more features; and
        for at least one subsequently received search query from the plurality of search queries, providing a corresponding ranked set of features in connection with a search result set responsive to the subsequently received search query to enable user refinement of the search result set according to one or more features in the provided ranked set of features.

2. The computer-implemented method of claim 1, wherein each search result of the plurality of search results correspond to items offered for consumption in an electronic marketplace, wherein each of the items are associated with one or more of the features associated with the search result.

3. The computer-implemented method of claim 1, wherein determining the potential improvement includes calculating a reciprocal rank reduction measurement.

4. The computer-implemented method of claim 1, wherein calculating a corresponding feature score, for a feature from a set of features, includes accumulating the measurements for a plurality of instances in which a search result associated with the feature was selected by a user.

5. The computer-implemented method of claim 1, further comprising:
    receiving information indicating one or more of the features in the provided ranked set of features selected by a user;
    refining the search result set according to the one or more selected features in the provided ranked set of features; and
    providing the refined search result set for display to the user.

6. A computer-implemented method for enabling information set modification, comprising:
    under the control of one or more computer systems configured with executable instructions,
        for each information unit from a plurality of information units that has been selected from a corresponding information set, identifying one or more attributes associated with the information unit;
        for each identified attribute of the one or more attributes, determining a potential improvement in position for at least one user-selected information unit achievable by modifying a corresponding information set according to an identified attribute of the one or more attributes, the potential improvement including a number of places that the at least one user-selected information unit would have moved within the corresponding information set had the identified attribute of the one or more attributes been selected;

ranking at least one attribute set based at least in part on the determined potential improvements; and providing the ranked attribute set to enable a user to modify an information set provided to the user.

7. The computer-implemented method of claim 6, wherein at least some of the information sets were provided responsive to user actions other than search query submissions.

8. The computer-implemented method of claim 6, wherein the information units are search results and wherein the information sets are search result sets.

9. The computer-implemented method of claim 6, wherein the information units correspond to items offered for consumption in an electronic marketplace.

10. The computer-implemented method of claim 9, wherein the one or more attributes are features associated with the items.

11. The computer-implemented method of claim 6, wherein determining the potential improvement in position for the identified attribute of the one or more attributes is based at least in part on a set of determined potential improvements for a plurality of user-selected information units associated with the identified attribute of the one or more attributes.

12. The computer-implemented method of claim 6, wherein determining the potential improvement in position, for an information unit selected by a user from an information set, is based at least in part on a calculation process that includes at least:

identifying an attribute of the one or more attributes associated with the information unit selected by the user from the information set; and determining a potential rank improvement of the information unit within a corresponding information set based at least in part on a number of information units ranked higher than the information unit that are unassociated with the identified attribute.

13. The computer-implemented method of claim 6, wherein the corresponding information set provided to the user was provided to the user in response to a search query submitted by the user.

14. A computer system for enabling information set modification, comprising:

one or more processors; and memory, including instructions executable by the one or more processors to cause the computer system to at least:

calculate scores for attributes based at least in part on measurements of potential position changes within information sets for information units that users have selected and that are each associated with at least one of the attributes, the potential position changes including a number of position places the information units that the users have selected would have moved within the information sets had the at least one of the attributes been selected;

for each of a plurality of queries, rank a set of attributes based at least in part on the calculated attribute scores for the information sets; and in response to receipt of a query from the plurality of queries, provide a corresponding ranked set of attributes in connection with an information sets responsive to the received query to enable user modification of the information set responsive to the received query according to one or more attributes in the provided ranked set of attributes.

15. The computer system of claim 14, wherein the information units that the users have selected are search results and wherein the information sets for the information units that the users have selected are search result sets.

16. The computer system of claim 14, wherein the information units that the users have selected correspond to items offered for consumption in an electronic marketplace.

17. The computer system of claim 14, wherein each calculated score for an attribute of the calculated scores for the attributes is based at least in part on at least one information unit's potential rank improvement achievable by modifying, according to the attribute, an information set in which the information unit appeared.

18. The computer system of claim 14, wherein each calculated score for an attribute of the calculated scores for the attributes is based at least in part on a rank reduction score for the attribute calculated for multiple instances in which an information unit associated with the attribute was selected by a user.

19. One or more non-transitory computer-readable storage media having collectively stored thereon executable instructions that, when executed by one or more processors of a computer system, cause the computer system to at least:

for each information unit of multiple information units that has been selected by a user from a ranked information set:

calculate a rank improvement score for at least one attribute associated with the information unit, the rank improvement score being based at least in part on a potential ranking improvement for the information unit that is achievable for the information unit by modifying the information set according to the at least one attribute associated with the information unit, the potential ranking improvement including a number of places that the information unit would have moved within the information set had the at least one attribute associated with the information unit been selected; and update a cumulative rank improvement score for the at least one attribute associated with the information unit based at least in part on the rank improvement score, the cumulative rank improvement score being based at least in part on previously calculated rank improvement scores for the at least one attribute associated with the information unit; and for each query of a plurality of queries, provide a ranking of attributes based at least in part on corresponding cumulative rank improvement scores to enable modification of information sets according to the ranked attributes.

20. The non-transitory one or more computer-readable storage media of claim 19, wherein each said information unit of the multiple information units are search results and wherein the information sets are search result sets.

21. The non-transitory one or more computer-readable storage media of claim 19, wherein each said information unit of the multiple information units correspond to items offered for consumption in an electronic marketplace.

22. The non-transitory one or more computer-readable storage media of claim 19, wherein the rank improvement score is a reciprocal rank improvement score.

23. The non-transitory one or more computer-readable storage media of claim 19, wherein providing the ranking of attributes includes providing for display a plurality of graphical interface elements that each correspond to an attribute from the ranked attributes, the graphical interface elements being positioned relative to one another based at least in part on the ranking of attributes.

24. The non-transitory one or more computer-readable storage media of claim 19, wherein the executable instructions stored thereon, when executed by one or more processors of a computer system, cause the computer system to at least:
- receive information indicating user selection of at least one of the ranked attributes; and
- provide a modified information set that has been refined according to the selected ranked attribute.

25. The non-transitory one or more computer-readable storage media of claim 19, wherein the information sets according to the ranked attributes include search results provided in response to user-submitted search queries.

* * * * *